No. 789,247.                                              Patented May 9, 1905.

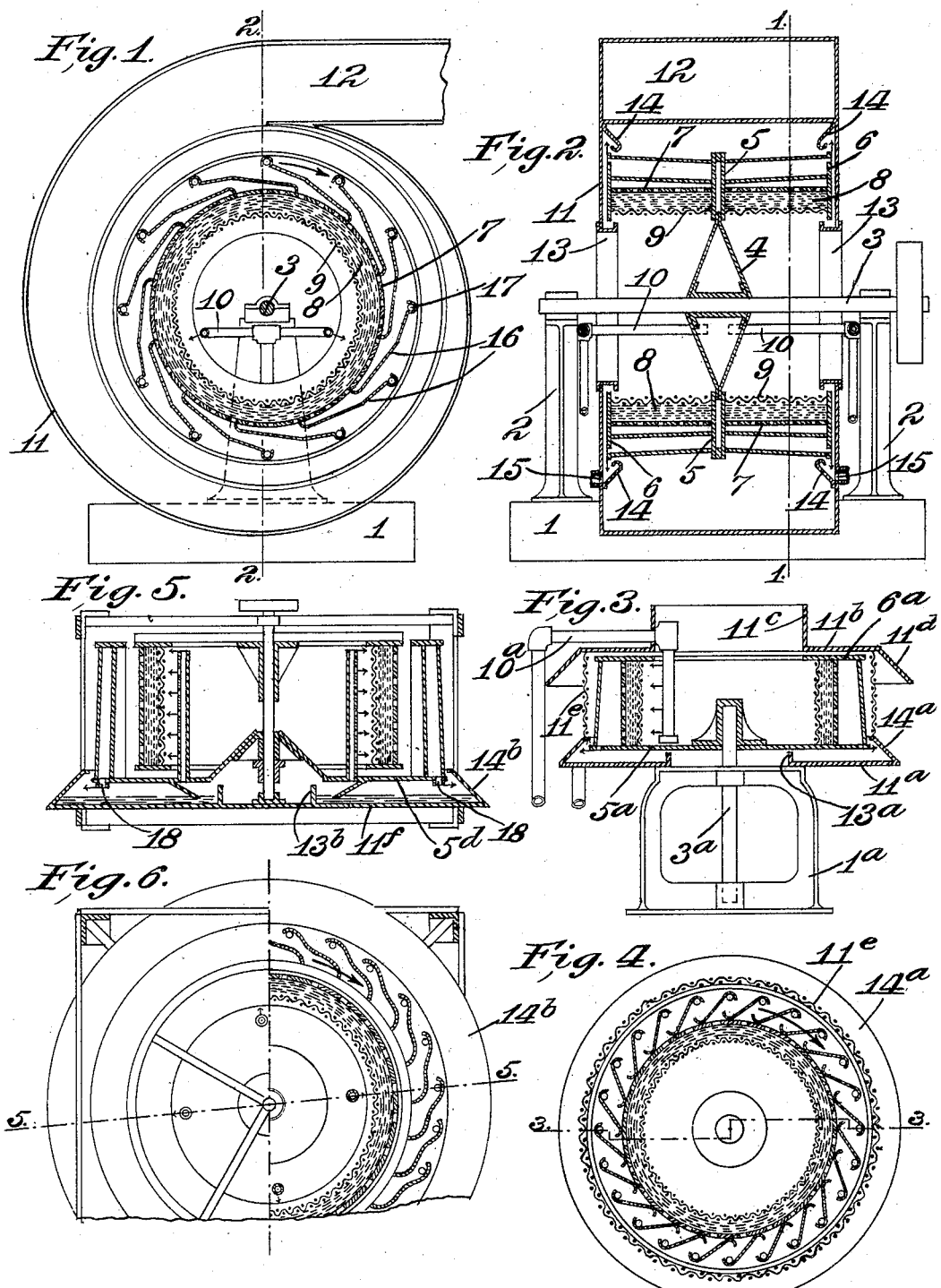

UNITED STATES PATENT OFFICE.

JOHN ZELLWEGER, OF ST. LOUIS, MISSOURI.

AIR FILTER AND COOLER.

SPECIFICATION forming part of Letters Patent No. 789,247, dated May 9, 1905.

Application filed August 13, 1904. Serial No. 220,667.

*To all whom it may concern:*

Be it known that I, JOHN ZELLWEGER, a citizen of the United States, residing at St. Louis, Missouri, have invented a certain new and useful Improvement in Air Filters and Coolers, of which the following is a full, clear, and exact description, such as will enable others skilled in the art to which it appertains to make and use the same, reference being had to the accompanying drawings, forming part of this specification, in which—

Figure 1 is a vertical sectional view through my improved air filter and cooler on the line 1 1 of Fig. 2. Fig. 2 is a similar view taken at right angles or on the line 2 2 of Fig. 1. Fig. 3 is a vertical sectional view through a modified form of filter and cooler on the line 3 3 of Fig. 4. Fig. 4 is a horizontal sectional view of the construction shown in Fig. 3. Fig. 5 is a vertical sectional view showing another modified form, and Fig. 6 is a horizontal sectional view of the construction shown in Fig. 5.

This invention relates to a new and useful improvement in air filters and coolers, the object being to purify and cool air for ventilating and other purposes.

The type of machine shown in the accompanying drawings is similar to that illustrated and described in the application for United States Letters Patent filed by me April 18, 1904, Serial No. 203,775, and I do not, therefore, broadly claim the type of machine of my said companion application except as the parts thereof enter into or are associated with my present improvement.

The objects of this invention are to provide compact means for separating water from air after their passage through the filter-ring and to provide means for collecting the water after its separation from the passing air.

The machine shown in said companion application is well suited for large capacities and for locations where space need not be economized; but I have found that often there is not room to install a machine of the required capacity and provided with a water-separator in the form of a large curved duct extending around the wheel-casing proper, and I have therefore constructed a more compact machine, in which the water is separated from the air as soon as the two leave the filter-ring. This I accomplish by the use of a rotatable system of shields or vanes disposed radially outside of the zone of rotation of the filter-ring. These shields or vanes I make to overlap each other and provide them with pockets or depressions by which to collect water and to convey it off laterally to the plane of rotation. In the preferred form of my invention these vanes are attached to the filter-wheel immediately outside of the filter-ring and provided at their outer edge with dipper-shaped gutters.

My present improvement consists in rotatably mounting the filter-ring within a zone of rotatable guttered vanes overlapping each other, said vanes being provided with pockets or recesses whereby the water is separated from the air and conducted off. By the provision of these guttered vanes it is possible to operate the air filter and cooler in a room or chamber whose air is to be purified and cooled without the use of any other inclosing casing for confining the moisture to the machine than that provided by the overlapping vanes.

So far as the construction of the filter-ring and several other parts of the machine are concerned, there are corresponding parts shown in my former application before referred to, and I will briefly describe them here.

1 indicates the base or frame, upon which are supported standards 2, having bearings in their upper ends for receiving a shaft 3, said shaft having its usual driving-pulley. Secured to the shaft 3 are disk plates 4, whose marginal edges are preferably adjacent each other and to which marginal edges are secured rings 5. These carrying-rings 5 and their companion rings 6 have attached to them the perforated cylinder 7, against the inner face of which is arranged the filtering material 8, of excelsior or other appropriate material. The gauze cylinder 9, preferably made up of wire mesh, is arranged against the inner face of the filtering material 8 to hold the same in place. The inner edge of ring 6 extends slightly beyond the wire mesh 9, as shown in Fig. 2.

10 indicates a pipe having appropriate perforated branches for spraying water onto the inner face of the filter-ring.

11 indicates a casing, which is preferably spiral in form, so as to provide a discharge-conduit 12 for the air. The side walls of this casing are provided with eyes through which the shaft 3 passes. In the eyes of the casing are arranged flanged rings 13 in the form of gutters. Around the filter-ring and secured to the side walls of the casing are flaring plates 14, whose inner edges overlap the sides of the filter-wheel and are folded inwardly to form gutters. These flaring plates, together with the ring 13 and the side of the casing, form an annular trough.

16 indicates vanes, which are preferably between the rings 5 and 6 of the filter-wheel, said vanes being at an angle to the radii of the wheel and overlapping each other. The outer edges of these vanes are turned so as to form gutters 17. These gutters preferably diverge from the axis of the wheel in the direction from center to side, as shown in Fig. 2, or they preferably diverge from the axis in the direction from top to bottom for horizontally-revolving wheels, as shown in Figs. 3 and 5. The connection between the vanes 16 and the rings 5 and 6 may be water-tight, and the ring at the outer end of the gutter is perforated in line with the gutter and may be provided with a spout 18. (Shown in Fig. 5.)

When the filter-wheel and the vanes are revolved rapidly, any water thrown off the perforated cylinder surrounding the filter-ring is caught on the inside of the overlapping vanes and by centrifugal force propelled over the vanes into the gutters 17 and then sidewise to the end of the gutter farthest away from the axis and through the opening in the wheel-ring. In both cases the water is thrown by centrifugal force against the inside of the flaring plate 14 and by it guided outwardly toward the casing 11. Any water that may flow inwardly over the flaring plate 14 is caught by the guttered edge of said plate. All the water is conveyed down to the pipe 15 and there discharged.

In Figs. 3 and 4 the filter-ring is constructed the same way as herein described, but rotates horizontally instead of vertically. In this construction there is a base-casting $1^a$, having a vertically-disposed shaft $3^a$ mounted therein, upon the upper end of which shaft is carried the filter-ring. The lower head of this filter-ring $5^a$ is not provided with an eye; but the upper head $6^a$ has an eye through which the air to be cooled and filtered is drawn. Water is delivered against the inner face of the filter-ring through the pipe $10^a$. This apparatus is provided with a tube $11^c$ and with a deflector $11^d$, extending, respectively, above and below a top plate $11^b$, for the purpose of preventing air which has been discharged from the machine from reëntering it. $11^a$, in combination with cone $14^a$ and flange $13^a$, forms a circular trough mounted on casting $1^a$ and serves as a collecting-trough for the water thrown off the disk $5^a$. The filter-wheel and vanes are surrounded and protected from contact with objects on the outside by a wire mesh $11^e$. In this machine the inner edges of the vanes are turned outwardly to cause all water that reaches these edges to be thrown off to prevent it from reaching the outside of the vanes.

In operation the construction shown in Figs. 3 and 4 is similar to that shown in Fig. 1—to wit, the air is drawn into the eye of the filter-ring against the inner face of which filter-ring, water is also discharged. Passing through the filter-ring the air is discharged in the room, there being no inclosing casing; but, if desired, instead of the guard-mesh $11^e$ a solid casing may be employed, delivering the air through a discharge-pipe, as described with reference to Fig. 1. The water passing through the filter-ring is delivered against the inner faces of the vanes, where it is collected by the gutters and conducted to one side and discharged into the pan in a well-understood manner.

In Figs. 5 and 6 I have shown a machine in which guttered overlapping vanes are detached from the filter-wheel and rotatably mounted on a separate carrying-disk $5^d$, which also carries a feed-cone and distributing-pipe. In this machine the vanes are corrugated to secure greater stiffness. The casing-plate $11^f$, together with the cone $14^b$, forms a circular tank comprising a circular trough outside of flange $13^b$ for water and a central tank around the shaft-bearing for oil.

The disposition of the vanes with respect to the rotating filter-ring may be such as shown in Figs. 1, 2, 5, and 6, where the inner edge of the vanes travels in advance of the outer edge. Where this construction is resorted to, the vanes should be arranged comparatively close together, so as to prevent the water from escaping between the vanes, or the vanes may be arranged as shown in Figs. 3 and 4, wherein the outer edges of the vanes travel in advance of the inner edges.

It will be obvious that the guttered vanes herein shown and described are applicable to the construction shown in my former application, said vanes preventing the water from being discharged against the surrounding casing or shell, if the apparatus is inclosed in such, or from being thrown outwardly into the room, in the event that the apparatus is designed to operate in a room, without resorting to the use of an inclosing shell.

I am aware that minor changes in the construction, arrangement, and combination of the various parts of my device can be made and substituted for those herein shown and described without in the least departing from the nature and principle of my invention.

Having thus described the invention, what is claimed as new, and desired to be secured by Letters Patent, is—

1. In an air filter and cooler, the combination with a rotating ring-support, of overlapping guttered vanes attached thereto, and means for introducing a liquid into the zone of rotation of said vanes; substantially as described.

2. In an air filter and cooler, the combination with a concentric series of rapidly-rotating overlapping vanes, gutters for conducting the water to the sides thereof, and means for introducing water into the zone of rotation of said vanes; substantially as described.

3. In an air filter and cooler, the combination of a rotating filter-ring, and guttered vanes attached to said filter-ring and overlapping each other; substantially as described.

4. In an air filter and cooler, the combination of a rotating filter-ring, and tangentially-disposed guttered vanes arranged around the periphery of said ring; substantially as described.

5. In an air filter and cooler, the combination of a rotating air-filter ring, vanes arranged around said ring, and gutters at the outer ends of said vanes for conducting water off to the side of the ring; substantially as described.

6. In an air filter and cooler, the combination of a rotating filter-ring, guttered vanes disposed around the periphery of said ring, and a circular trough overlapping the ends of said vanes and gutters; substantially as described.

7. In an air filter and cooler, the combination of a rotating filter-ring, obliquely-disposed vanes arranged around the periphery thereof, gutters for collecting the water arrested by said vanes, said gutters discharging the water at the side of the filter-ring; substantially as described.

8. In an air filter and cooler, the combination of a rotating filter-ring, means for supplying the water to the inner face thereof, tangentially-disposed guttered vanes arranged around the periphery of said ring for collecting the water thrown from the filter-ring, and a trough for receiving the water discharged from the vanes; substantially as described.

9. In an air filter and cooler, the combination of a rotating filter-ring, overlapping vanes arranged around the periphery thereof having gutters at their outer ends, rings forming flanges to which said vanes are connected, said vanes being obliquely disposed with respect to the axis of rotation of the filter-ring and having an outlet for water at the end farthest from the axis; substantially as described.

10. In an air filter and cooler, the combination with a casing, of a filter-ring mounted to rotate therein, water-collecting vanes carried by said filter-ring, means for causing the water collected by the vanes to be discharged at the side of the filter-ring, and a concentric trough mounted on the walls of the casing and extending inwardly beyond the ends of the vanes in said troughs; substantially as described.

11. In an air filter and cooler, the combination with a casing whose side walls are provided with eyes, circular troughs 13 arranged in said eyes, a rotating filter-ring, guttered vanes carried by said filter-ring, which vanes are obliquely disposed, and concentric troughs 14 extending inwardly over the ends of the guttered vanes; substantially as described.

In testimony whereof I hereunto affix my signature, in the presence of two witnesses, this 9th day of August, 1904.

JOHN ZELLWEGER.

Witnesses:
F. R. CORNWALL,
GEORGE BAKEWELL.